United States Patent [19]
Löchner et al.

[11] Patent Number: 6,064,583
[45] Date of Patent: May 16, 2000

[54] CHARGE PUMP FOR DIVIDING INPUT VOLTAGE AND MULTIPLYING OUTPUT CURRENT

[75] Inventors: Michael Löchner, Filderstadt; Werner Schiemann, Fellbach, both of Germany

[73] Assignee: The Foxboro Company, Foxboro, Mass.

[21] Appl. No.: 09/362,176

[22] Filed: Jul. 27, 1999

Related U.S. Application Data

[63] Continuation of application No. PCT/US98/03391, Feb. 11, 1998
[60] Provisional application No. 60/037,898, Feb. 11, 1997.

[51] Int. Cl.[7] ........................................ H02M 3/07
[52] U.S. Cl. ............................... 363/62; 307/110
[58] Field of Search .................... 363/60, 62, 59; 307/110

[56] References Cited

U.S. PATENT DOCUMENTS

| | | | |
|---|---|---|---|
| 4,485,432 | 11/1984 | Kidena et al. | 363/62 |
| 4,750,099 | 6/1988 | Inoue et al. | 363/62 |
| 5,245,524 | 9/1993 | Nakagawa et al. | 363/62 |
| 5,345,376 | 9/1994 | Nourbakhsh | 363/62 |
| 5,406,471 | 4/1995 | Yamanaka | 363/124 |
| 5,414,614 | 5/1995 | Fette et al. | 363/59 |
| 5,446,644 | 8/1995 | Zhou | 363/62 |
| 5,532,916 | 7/1996 | Tamagawa | 363/62 |
| 5,561,597 | 10/1996 | Limpaecher | 363/59 |
| 5,581,454 | 12/1996 | Collins | 363/59 |
| 5,680,300 | 10/1997 | Szepesi et al. | 363/59 |
| 5,764,501 | 6/1998 | Limdaecher | 363/61 |

*Primary Examiner*—Adolf Deneke Berhane
*Attorney, Agent, or Firm*—Jones, Day, Reavis & Pogue

[57] ABSTRACT

A current conversion circuit having multiple voltage levels with CMOS gates that switch the output capacitors so as to be coupled to the input of another voltage level to move the charge from one voltage level to another voltage level and thus increase the output current while decreasing the output voltage.

6 Claims, 3 Drawing Sheets

CHARGE PUMP FOR DIVIDING INPUT VOLTAGE AND MULTIPLYING OUTPUT CURRENT

CROSS-REFERENCES TO RELATED APPLICATIONS

This application is a continuation of copending International Application Ser. No. PCT/US98/03391, filed Feb. 11, 1998 claiming the benefit of U.S. Provisional Application Ser. No. 60/037,898, filed Feb. 11, 1997.

BACKGROUND OF THE INVENTION

1. Field of the Invention

The present invention relates in general to charge pumps and specifically to a charge pump that divides an input voltage to a desired fraction of that voltage at the output while at the same time multiplying the input current by the same fraction to achieve an increased output current.

2. Description of Related Art Including Information Disclosed Under 37 CFR 1.97 and 1.98

There are many different types of charge pumps. Some multiply an input voltage to get a higher output voltage or to generate bipolar voltages.

Because of the many different application requirements, it would be advantageous to have an input voltage that could be divided to achieve a desired output voltage while at the same time multiplying the output current by the same ratio.

It would also be advantageous to have such circuit that has a very low power consumption, is simple to be built with standard elements like CMOS gates and some discrete elements, that could have an input with a negative impedance to compensate the voltage drop on long termination cables for the input signal, that would be usable as a DC voltage to DC voltage converter with a controlled input voltage and an uncontrolled but stable output voltage and, as stated earlier, that could be used to with different input voltages to convert to different output voltages and currents.

SUMMARY OF THE INVENTION

The present charge pump circuit can be built with very simple CMOS gates. For example, 74AC14 CMOS gates can be used. To reduce the output impedance, it is easy to parallel the CMOS gates. These CMOS gates are low impedance switching elements to the ground pin or a low impedance to the power supply pin. The CMOS gates switch their outputs to couple capacitors to other outputs from another voltage level to move the charge from one voltage level to another voltage level. The charge is buffered within capacitors beside the CMOS gates. The current path is across the supply pins of the gates to the outputs of the gates. Capacitors between the coupled gate outputs are charged and discharged with the charge from the capacitors paralleling the gates and with the input current.

In one embodiment, two coupled gates must switch at the same time, with the same phase. If the voltages of the different voltage levels are equal, that is having the same value, then no charge will be transferred. That would mean that no current would flow across the different voltage levels. If the circuit is sourced by an input current of 4–20 mA and on the output there is no load or not sufficient load to consume the current, then the capacitors would be charged by the current while the voltage would rise.

To control the output voltage, the current not needed for the load must be bypassed. There are several versions to bypass the current. The first version is to bypass the current directly on the output parallel to the load. The second version is to bypass the current directly on the input parallel to the input. The third version is to bypass the current only between levels. The effect is that the current, which is not used on the output load, flows back to the charge pump and creates an antivoltage across the charge pump. This causes the input voltage to come down or decrease. With this method if the input current increases and the output has enough voltage, the lower input voltage can compensate the additional voltage drop along the input source lines, especially if these lines are very long as is often the case in field wiring. Thus, the input has a negative impedance.

Another feature of the present invention is that it should fulfill different application requirements. For example, it should run with an input current of 4–20 mA or run with a constant current of 8 or 12 mA, or to run with an input current of 10–50 mA. If a 4–20 mA current is given and the load needs to have more than 9 mA at 3.3 V, then it is necessary to convert with three voltage levels, such as, for example, 9.9 V and 3.0 mA to 3.3 V and 9.0 mA.

With a two-level conversion, the input voltage will drop down to 6.6 V; with no conversion, the output voltage will be only about 3.3 V. The present invention illustrates a simple way of changing the input voltage by appropriate signals to CMOS gates while an additional CMOS gate in the configurable voltage level is used with its output as the current input for the lower voltage level.

Thus the present invention relates to a current conversion circuit in which the output voltage can equal the input voltage, the output voltage can be one-half of the input voltage and the output current can be twice the input current, the output voltage can be one-third of the input voltage and the output current can be three times the input voltage such that by continually adding new circuits (n circuits), the output voltage can be one-nth ($1^{nth}$) of the input voltage while the output current can be n times the input current.

Thus it is an object of the present invention to provide a charge pump that can multiply the input current at the output terminal and decrease the input voltage at the output terminal by the same factor as the current increases.

It is still another object of the present invention to provide a current conversion circuit that has a very low power consumption and that is built with standard elements such as CMOS gates.

It is still another object of the present invention to provide a current conversion circuit that has an input with a negative impedance to compensate for the voltage drop on long termination cables for the input signal.

It is also an object of the present invention to provide a current conversion circuit having a controller that enables a range of output currents and output voltages to be obtained.

Thus, the present invention relates to a current conversion circuit comprising first and second switches connected in series between an input voltage line that carries an input current and a ground line, each of the first and second switches having an input, an output, a voltage input terminal, and a ground terminal, the ground terminal of the first switch being coupled to the input voltage terminal of the second switch, an output voltage terminal coupled to the voltage input terminal of the second switch, first and second series coupled capacitors connected across the input voltage line and ground, and at least one charge capacitor coupled to the first and second switches and the first and second series capacitors for doubling the input current and having the input voltage at the output terminal.

BRIEF DESCRIPTION OF THE DRAWINGS

These and other features of the present invention will be more fully disclosed when taken in conjunction with the following Detailed Description of the Preferred Embodiment(s) in which like numerals represent like elements and in which.

DETAILED DESCRIPTION OF THE PREFERRED EMBODIMENT(S)

Figure 1:
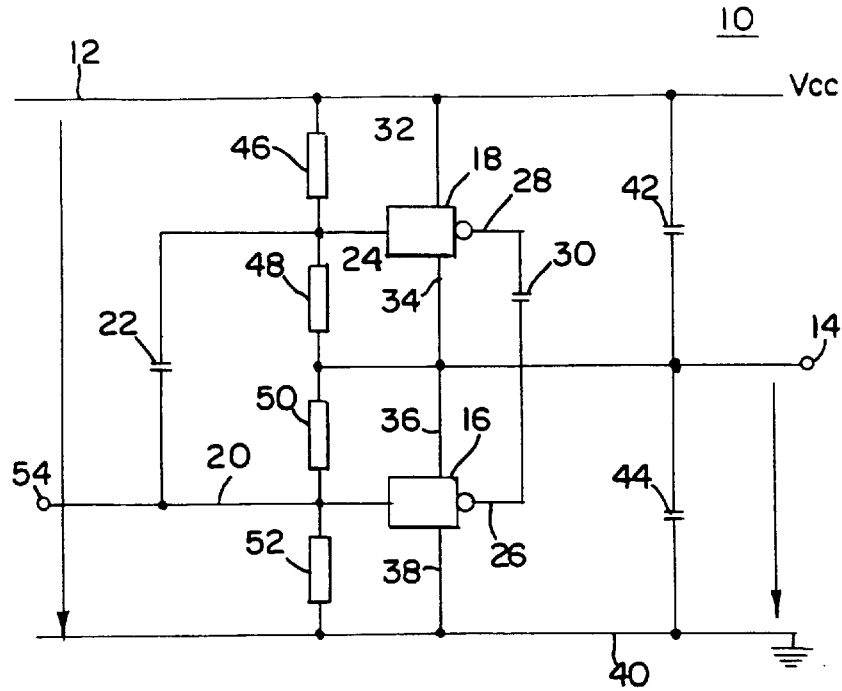
FIG. 1 is a schematic diagram of a two-level DC/DC converter block.

FIG. 1 is a schematic diagram of a two-voltage level DC/DC converter block designated by the numeral 10. It has an input voltage, $V_{cc}$, on line 12 and an output at terminal 14. The voltage at terminal 14 is one-half of the DC voltage on line 12. The current at the terminal 14 is twice the current on input line 12. Thus, the input voltage is divided in half and the output current is doubled. For the first level there is a CMOS gate 16 and for the second level there is a CMOS gate 18. The output of CMOS 16 is coupled on line 20 through capacitor 22 to the input of CMOS gate 18 on line 24. The input 26 of CMOS gate or switch 16 is coupled to the input 28 of CMOS gate or switch 18 by a capacitor 30. The DC input voltage on line 12 is coupled on line 32 to the input of CMOS gate or switch 18 while the ground pin of the CMOS switch 18 on line 34 is coupled to the output terminal 14 and to the input voltage pin on line 36 of CMOS gate or switch 16. The ground pin of CMOS gate 16 is coupled on line 38 to ground wire 40. Capacitors 42 and 44 are coupled in series between the input line 12 and the ground line 40. Capacitor 42 parallels CMOS gate or switch 18 while capacitor 44 parallels CMOS gate or switch 16.

Four resistors, 46, 48, 50, and 52, are connected in series across the input line 12 and the ground line 40. These resistors serve as voltage stabilizing resistors.

Figure 5:
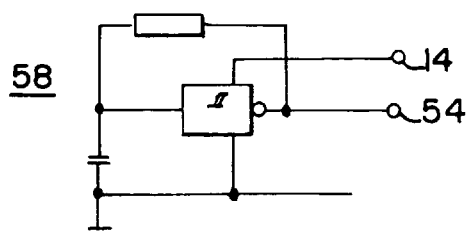
FIG. 5 is a generalized block diagram of an oscillator used in the present invention.

In operation, an input signal at terminal 54 from an oscillator terminal 56 shown in FIG. 5 causes both CMOS switches 16 and 18 to switch simultaneously. In one position of the switch, capacitor 30 is coupled to output terminal 14 in parallel with capacitor 42, while in the other position of the CMOS switches 16 and 18, the voltage on capacitor 30 is coupled in parallel through switch 16 with capacitor 44 to output terminal 14. Thus the oscillator 58 in FIG. 5 switches the CMOS switches 16 and 18 ON and OFF in the same phase. Switching these gates to charge and discharge capacitors 22 and 30 forces the voltage level in level one at output terminal 14 and the voltage between terminal 14 and the input line 12 to be the same. In the first voltage level with an output at terminal 14, the current from level two is added to the current which flows through all the gates in series.

Figure 2:
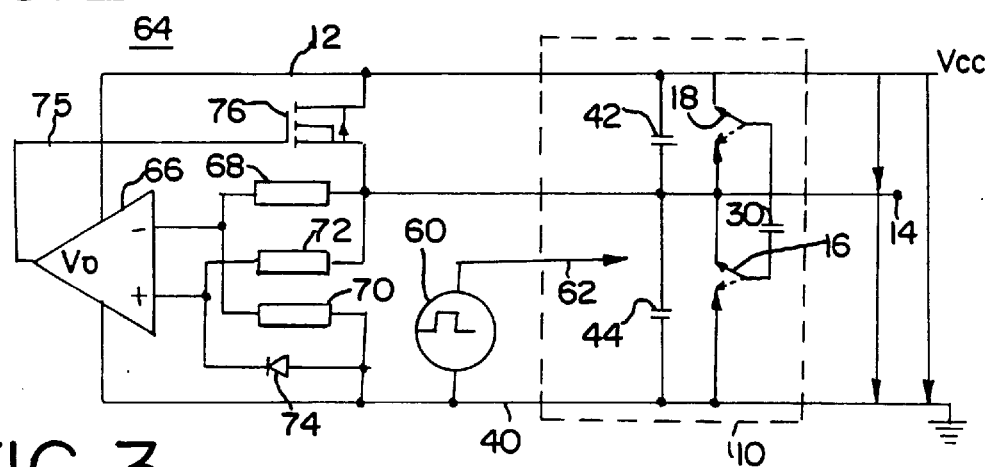
FIG. 2 is a simplified current converter circuit illustrating the DC/DC converter block and the voltage-to-voltage controller attached thereto that will enable the input to have a negative impedance to compensate for the voltage drop on long termination cables.

FIG. 2 is a schematic diagram of the charge pump to illustrate its operation. The two-voltage level DC/DC converter block in FIG. 1 is shown in phantom lines as block 10 in FIG. 2. A pulse generator 60, such as a square-wave oscillator shown in FIG. 5, has an output on line 62 that is coupled to the CMOS switches 16 and 18 to simultaneously switch them in a manner well known in the art. When switches 16 and 18 are in the position shown by the solid lines, the input voltage is coupled through switch 18, capacitor 22, and switch 16 back to the output signal terminal 14. Thus capacitor 30 is in parallel with upper level capacitor 42. When the switches are in the position shown by the phantom lines, the capacitor 23 is in parallel with lower level capacitor 44. Thus, while the output voltage on terminal 14 is reduced to one-half of the input voltage on line 12 by capacitors 42 and 44, the current at output terminal 14 is doubled by the pumping action of capacitor 30 when compared to the input current in line 12.

The output voltage on terminal 14 is controlled by voltage controller 64. There are several different possibilities for controlling the output voltage at terminal 14. If the input voltage, $V_{in}$, on line 12 is a constant voltage, then the output voltage at terminal 14 will also be constant and one-half of the input voltage. Thus $V_{in} = n \times V_{OUT}$, where n is the number of voltage levels. In a two-level voltage level shifter, the output voltage would be, of course, one-half of the input voltage.

If the input on line 12 is coupled to a constant current source, for example, $I_{in} = 4-20$ mA, and this input current is higher than the load current at the output terminal 14 divided by n (where n=voltage-levels), then the overcurrent can be sinked with the transistor 76 (in FIG. 2) in different ways. Example: in FIG. 3, the overcurrent can be bypassed between input 12 and output 40. The current through transistor 76 is $$I_s = \frac{[I_{in} - I_{out}]}{n}.$$

The output voltage control is accomplished by operational amplifier 66 comparing the output voltage at terminal 14 with a voltage produced by resistor 72 and reference diode 74. Any difference voltage is coupled on line 75 to transistor 76 which conducts and bypasses excess current or overcurrent to the circuit input.

In FIG. 2, the overcurrent can be bypassed between 12 and 14. The current through transistor 76 is $$I_s = \frac{[n \times I_{in} - I_{out}]}{(n-1)}.$$

The output voltage control is accomplished by operational amplifier 66 comparing the output voltage at terminal 14 with a voltage produced by resistor 72 and reference diode 74. Any difference voltage is coupled on line 75 to transistor 76 which conducts and bypasses excess current or overcurrent to the output load.

If the input line 12 is supplied with a current source, for example 4–20 mA, then any overcurrent at the output terminal 14 can also be sinked by the load between the input 12 and the output 14. This is similar to a second output of the charge pump in which a second variable load, driven by the voltage controller 64, is connected. The effect of this current sink is, that the overcurrent, seen on the output terminal 14, flows backward through the charge pump to the second load. If the charge pump has an impedance of $R_i$, then the current flow, ($I_2$), will cause an additional voltage on the input line 12, which is $I_2 \times R_i$. The available current on the output terminal 14 will be $I_1 = nI_2$, where n is the number of voltage levels in the circuit.

The equation for the output node is:

(1) $I_{load} = I_s + I_1$, and with $I_1 = n \times I_2$ becomes (2) $I_s = I_{load} - n \times I_2$.

The equation for the input node is:

(3) $I_{in} = I_s + I_2$, where $I_2 = I_1/n$.

The voltage drop of the charge pump is $I_{in} = I_s + I_2$.

The equation for $I_2$ using equation (3) and where $I_s$ is replaced with equation (2) is:

(4) $I_2 = I_{in} - I_s = I_{in} - [I_{load} - n \times I_2]$, and (5) $I_2[1-n] = I_{in} - I_{load}$, and (6) $I_2 = [I_{in} - I_{load}]/(1-n)$ or equals the voltage drop divided by $R_i$ or (7) $V/R_i = I_2 = [I_{in} - I_{load}]/[1-n]$, if n>1.

Explanation of terms:

$I_{in}$: Input current, for example 4–20 mA.

$I_2$: Input current to the charge pump.

$I_1$: Output current to the charge pump.

$I_{load}$: Load current of the output load.

$I_s$: Sinked current on transistor 76.

if $I_{in} = I_{load}$, then the current $I_2$ is zero and the load current flows only through the transistor 76 from the input 12 directly to the output 14. If $I_{load}$ is lower than $I_{in}$, then the voltage drop is negative. If $I_{load}$ is higher than $I_{in}$ but maximum ($n \times I_{in}$) then the voltage drop is positive. If the $I_{load}$ is higher than $n \times I_{in}$, then no current will flow through transistor 76 and the output voltage becomes an uncontrolled lower voltage.

Figure 3:
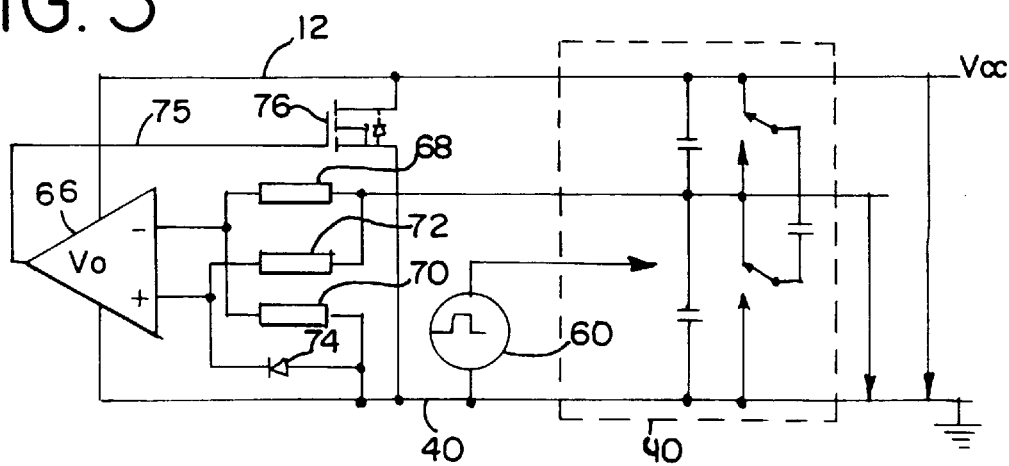
FIG. 3 is a schematic block diagram of the current conversion circuit including the DC/DC converter block and the controller associated therewith that provides a stable input voltage.

The remainder of the circuitry in block 10 of FIG. 3 operates the same as disclosed in relation to FIG. 2.

Figure 4:
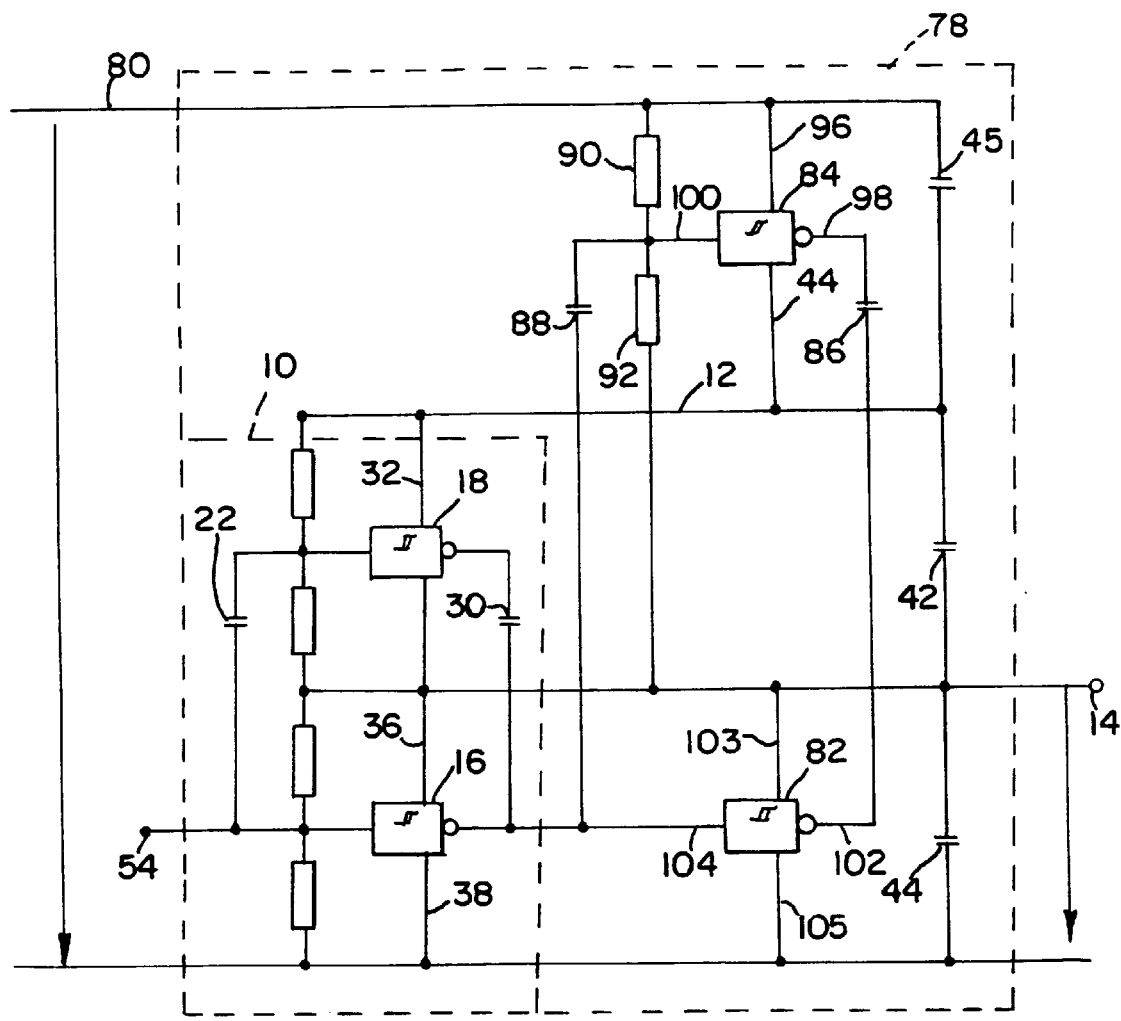
FIG. 4 is a schematic block diagram of a three-level DC/DC converter block.

FIG. 4 illustrates a three-voltage level DC/DC converter block 78. The circuitry within block shown in phantom lines 10 is identical to the circuitry shown in FIG. 1 except that the capacitors 42 and 44 are shown on the right-hand side of FIG. 4. In FIG. 4, the ground pin of gate or switch 84 on line 94 is coupled to the input terminal of switch 18 on line 32. The input DC voltage on line 80 is coupled on line 96 to the input voltage pin of the CMOS switch 84. Both the input and output lines 98 and 100 are coupled with respective capacitors 86 and 88 to the first voltage level to the input 102 and the output 104, respectively, of CMOS switch 82. The oscillator 58 shown in FIG. 5 switches the CMOS switches 16 and 18 ON and OFF in the same phase and CMOS switches 82 and 84 in an antiphase to switches 16 and 18. This reduces the ripple voltage on the input line 80. By switching these gates as indicated, the charging and discharging of the capacitors 86 and 88 forces the different voltage levels to have the same voltage values. At the first voltage level, output terminal 14, the current from the other levels are added to the current which flows through all of the gates in series. The result is that the output voltage is one-third of the input voltage and the output current is three times the input current.

Figure 6:
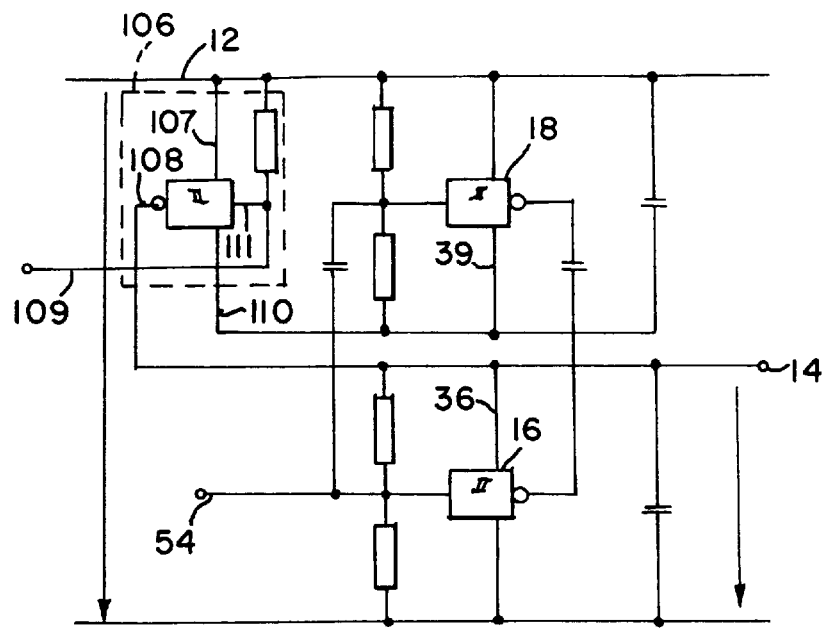
FIG. 6 is a generalized block diagram of a two-level DC/DC current conversion circuit including a control switch that selectively enables the output voltage either to be equal to the input voltage or to be one-half the input voltage.

FIG. 6 is a schematic diagram of a two-level DC/DC converter in which the voltage levels can be selected by a signal. The only difference in FIG. 6 and FIG. 1 is that a switch 106, a CMOS switch, is interposed between the ground line 39 of switch 18 and the input voltage line 36 of switch 16. If switch 106 is closed, then it couples the ground line 39 of switch 18 directly to the input line 36 of gate or switch 16, thus making the circuit identical to that shown in FIG. 1. However, if switch 106 is open, then level one with its output at terminal 14 is separate from upper level two (switch 18). Thus if the input 108 of CMOS gate 106 is pulled up to the input voltage level on line 12, then the additional voltage level is selected and the circuit works as described in the two-voltage level shifter circuit shown in FIG. 1. If the input of the CMOS gate 106 on line 108 is pulled down to the signal level on line 110 from ground pin 39 of switch 18, then the level shifter is OFF and the input voltage on line 12 is equal to the output voltage on line 14.

Thus, in summary, switch 106 in its first state connects input line 12 voltage to output terminal 14, the level shifter is OFF, and the input voltage is equal to the output voltage. On the other hand, if switch 106 couples its input 108 to line 110 that is coupled to the ground pin on line 39 of switch 18, then the additional voltage level is selected and the circuit works as has been described in the rest of FIG. 1.

Figure 7:
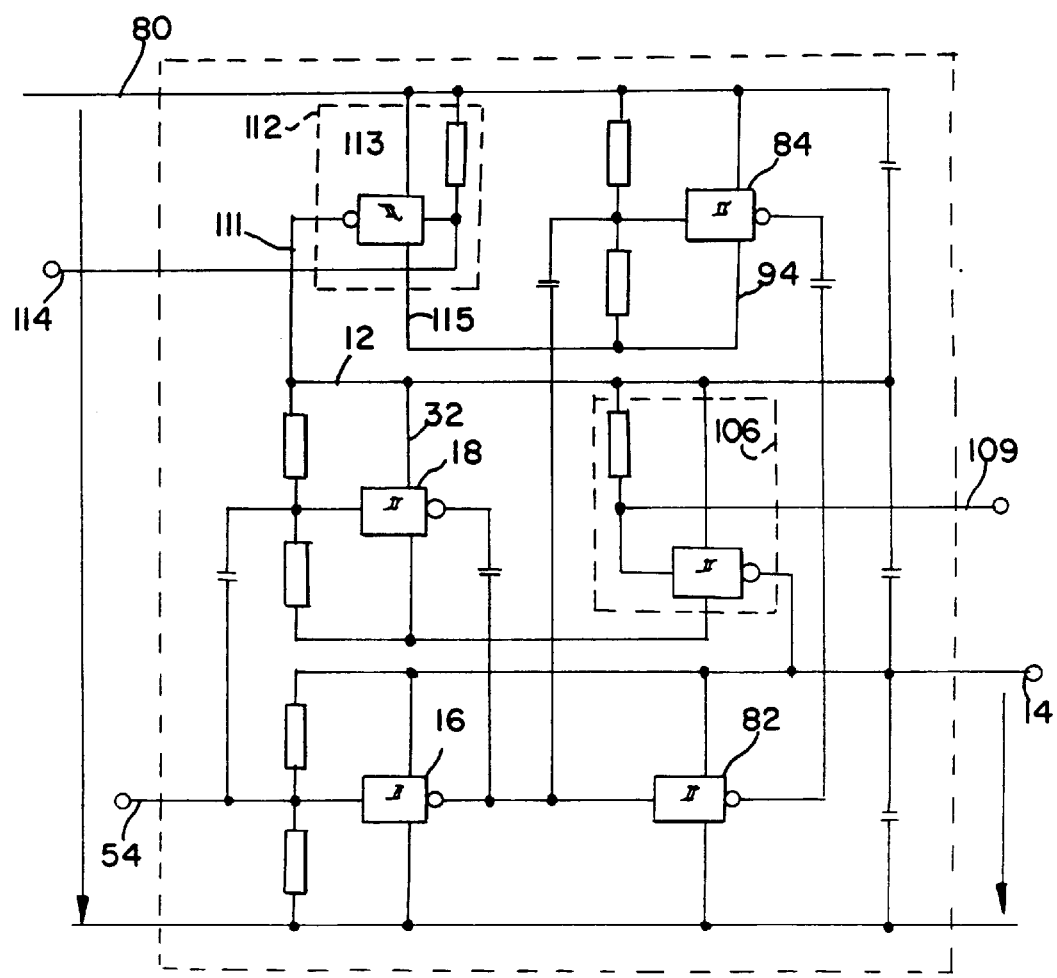
FIG. 7 is a schematic block diagram of the novel current conversion circuit adding a second control switch to selectively enable three levels of output voltage to be obtained.

In FIG. 7, there is disclosed a schematic block diagram of a three voltage level DC/DC converter. It is identical to the one shown in FIG. 4 except that in addition to switch 106 a second switch 112 has been added between the second and third levels. Thus, switch 112 is interposed between the ground lead of switch 84 and the input voltage lead of switch 18 while switch 106 is interposed between the ground lead from switch 18 and the input voltage lead of switch 16. Switch 112 works in the identical manner as described with relation to switch 106 and either couples the full input voltage on line 80 directly to the second voltage level on line 12 or it connects the ground pin from switch 84 on line 94 directly to line 12, thus making the circuit the same as that shown in the upper two levels of FIG. 4. When it is desired that the additional level be selected in FIG. 6, an enable signal is applied to line 109 to cause CMOS switch 106 to have the proper state for selecting another voltage level. In FIG. 7, the enabling signal is coupled to line 114. The second level enable signal to switch 106 is applied in on line 109 in both FIG. 6 and FIG. 7. When the third level is selected with the enable signal on line 114, the output at terminal 14 in FIG. 7 is one-third of the input voltage and three times the input current. Obviously, n levels could be developed following the procedure just described.

The oscillator 58, shown in FIG. 5, has outputs 14 and 54. The output on line 54 is coupled to terminals 54 in FIGS. 1, 4, 6, and 7, while the output on terminal 14 is coupled to the output terminal 14 in FIGS. 1, 4, 6, and 7.

Thus there has been disclosed a novel current conversion circuit that includes a charge pump, oscillator, and voltage regulator built with gates and capacitors, an operational amplifier and a few resistors and a reference diode. The circuit has very low power consumption, is very simple to build with standard CMOS gate elements, and provides a constant input voltage and a constant output voltage. It may have an input with a negative impedance to compensate for the voltage drop on long termination cables for the input signal. It has a controlled input voltage and an uncontrolled, but also stable, output voltage. The circuit has a better than 95% output to input power ratio. Modified circuits allow different input voltages to be selected and can be converted, for example, from 3 mA and 9 V input to 9 mA and 3 V output. In another level, it can be converted from the 4.5 mA and 6 V input to 9 mA and 3 V output. With a three-level stage, it may have a 9.9 V and 3 mA input and a 3.3 V and 9 mA output.

The corresponding structures, materials, acts, and equivalents of all means or step plus function elements in the claims below are intended to include any structure, material, or act for performing the function in combination with other claimed elements as specifically claimed.

We claim:

1. A current conversion circuit comprising:

first and second switches (16, 18) connected in series between an input voltage line (12) that carries an input voltage, $V_{in}$, and an input current, $I_{in}$, and a ground line (40), each of said first and second switches (16, 18) having an input terminal (26, 28) and an output terminal (20, 24), an input voltage terminal (32, 36), and a ground terminal (34, 38);

said ground terminal (34) of said second switch (18) being coupled to the input voltage terminal (36) of said first switch (16);

an output voltage terminal (14) coupled to said input voltage terminal (36) of said first switch (16);

first and second series coupled capacitors (42, 44) connected between said input voltage line (12) and ground (40); and at least one charge capacitor (22) coupled to said first and second switches (16, 18) and said first and second capacitors (42, 44) for equalizing the voltage across the first and second capacitors (42, 44) while doubling the input current at the output terminal (14).

2. The current conversion circuit of claim 1 further including:

an output voltage controller (64) coupled to said ground (40) and said output voltage terminal (14) for comparing the voltage on output terminal (14) with a reference voltage (74) and generating an output signal relating to the difference thereof, and a gate (76) coupled between the input voltage line (12) and the output terminal (14) and receiving said output signal from said controller for bypassing current from said input voltage line (12) to said output terminal (14) based on the difference between the output voltage and the reference voltage thereby stabilizing the output voltage.

3. The current conversion circuit of claim 1 further including:

an output voltage controller (64) coupled to said output terminal (14) and ground line (40) for comparing said output voltage (14) and a reference voltage (74) and generating an output signal relating to the difference thereof; and a gate (76) coupled between said input voltage line (12) and said ground line (40) for receiving said output signal from said output voltage controller (64) for bypassing excess current to the input of the current conversion circuit (12, 40), based on the difference between the output voltage at terminal (14) and the reference (74) thereby stabilizing the input voltage on line (12) and the output voltage on terminal (14) through the capacitive coupling (42, 44) between input voltage and the output terminal (14).

4. The current conversion circuit of claim I further including:

a level control switch (106) having a first terminal (107) coupled to said input voltage line (12), a second terminal (110) coupled to ground terminal (39) of said second switch (18), and a third terminal (108) coupled to said input voltage terminal (36) of said first switch (16) and to output terminal (14);

a fourth terminal (111) on said control switch (106) for selectively receiving an enable signal to actuate said control switch (106); and said control switch (106), when activated, coupling said second terminal (110) to said third terminal (108) for providing a two-voltage-level operation of said current conversion circuit and when nonactivated, coupling said first terminal (107) to said third terminal (108) to cause the input voltage to be coupled to the output voltage terminal (14) for providing a single-voltage-level operation of said current conversion circuit.

5. The current conversion circuit of claim 1 further including:

a third switch (84) having an input voltage terminal (96) coupled to the input voltage line (12) and a ground terminal (94) coupled to the input terminal of said second switch (18);

a fourth switch (82) having an input line (102), an output line (104), a input voltage terminal (103), and a ground terminal (105);

the first and fourth switches (16 and 82) having their input terminals (36 and 103) and their ground terminals (38 and 105) connected in parallel; and said oscillator (58) being coupled to said third and fourth switches (82 and 84) for both providing three times the input current at the output terminal (14) and one-third of the input voltage (80) at the output terminal (14) upon activation of said switches by said oscillator.

6. The current conversion circuit of claim 5 further comprising:

a second control switch (112) having a voltage input terminal (113) coupled to an input voltage line (80), a ground terminal (115) coupled to the ground terminal (94) of said third switch (84), and an input terminal (111) coupled to the input voltage terminal (32) of said second switch (18) such that when said second control switch (112) is simultaneously activated with said first control switch (106), a current three times the input current and a voltage one-third of the input voltage is present on the output terminal (14).

* * * * *